(12) United States Patent
Shimada (10) Patent No.: US 10,746,293 B2
(45) Date of Patent: Aug. 18, 2020

(54) FLUID PRESSURE CIRCUIT (71) Applicant: Eagle Industry Co., Ltd., Tokyo (JP)

(72) Inventor: Yoshiyuki Shimada, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 16/323,742

(22) PCT Filed: Aug. 22, 2017

(86) PCT No.: PCT/JP2017/029875
§ 371 (c)(1),
(2) Date: Feb. 6, 2019

(87) PCT Pub. No.: WO2018/043196
PCT Pub. Date: Mar. 8, 2018

(65) Prior Publication Data
US 2019/0178374 A1    Jun. 13, 2019

(30) Foreign Application Priority Data
Aug. 29, 2016 (JP) .................................. 2016-167179

(51) Int. Cl.
F16H 61/4096 (2010.01)
F16H 61/4061 (2010.01)
B60K 6/12 (2006.01)

(52) U.S. Cl.
CPC ............ F16H 61/4096 (2013.01); B60K 6/12 (2013.01); F16H 61/4061 (2013.01)

(58) Field of Classification Search
CPC .... F16H 61/4096; F16H 61/4061; B60K 6/12
See application file for complete search history.

(56) References Cited

U.S. PATENT DOCUMENTS

| 4,592,454 A | * | 6/1986 | Michel ..................... B60K 6/12 180/165 |
| 4,754,603 A | | 7/1988 | Rosman ......................... 60/415 |

(Continued)

FOREIGN PATENT DOCUMENTS

| CN | 101631974 | 1/2010 | ............. F15B 21/04 |
| CN | 103148064 | 6/2013 | ............... E02F 9/22 |

(Continued)

OTHER PUBLICATIONS

International Search Report (w/translation) and Written Opinion issued in application No. PCT/JP2017/029875, dated Oct. 24, 2017 (9 pgs).

(Continued)

*Primary Examiner* — Abiy Teka
*Assistant Examiner* — Michael Quandt
(74) *Attorney, Agent, or Firm* — Hayes Soloway P.C.

(57) ABSTRACT

A fluid pressure circuit includes an HST circuit having a variable capacity fluid pressure pump configured to be driven by a mechanism to perform forward-reverse rotation, a fluid pressure motor configured to be driven by fluid discharged from the fluid pressure pump to perform forward-reverse rotation, a first line configured to connect a first port of the fluid pressure pump and a first port of the fluid pressure motor, and a second line configured to connect a second port of the fluid pressure pump and a second port of the fluid pressure motor; an accumulator connected in parallel with the fluid pressure pump; an accumulator pump configured to accumulate pressure fluid in the accumulator; and an accumulator switching valve configured to switch connection between the fluid pressure motor and the accumulator.

7 Claims, 9 Drawing Sheets (56) References Cited

U.S. PATENT DOCUMENTS

| | | | |
|---|---|---|---|
| 8,468,818 B2 | 6/2013 | Hyodo et al. | 60/456 |
| 8,826,654 B2 * | 9/2014 | Nelson | F16H 61/438 60/413 |
| 8,839,617 B2 * | 9/2014 | Nelson | E02F 9/2217 60/413 |
| 2009/0084102 A1 | 4/2009 | Mueller | F16H 61/4096 |
| 2009/0165451 A1 | 7/2009 | Mueller et al. | 60/478 |
| 2011/0302914 A1 | 12/2011 | Helbling | 60/416 |
| 2012/0304631 A1 | 12/2012 | Nelson | F16H 61/4096 |
| 2013/0125536 A1 | 5/2013 | Ho et al. | 60/327 |
| 2013/0133318 A1 | 5/2013 | Vogl et al. | F15B 1/02 |
| 2015/0165887 A1 * | 6/2015 | Krittian | B60K 6/12 60/414 |

FOREIGN PATENT DOCUMENTS

| | | | | |
|---|---|---|---|---|
| DE | 102005060994 | 6/2007 | | B60K 17/10 |
| DE | 102010006464 | 8/2011 | | F15B 1/02 |
| JP | H116557 | 1/1999 | | F16H 47/04 |
| JP | 2010537130 | 12/2010 | | E02F 9/22 |
| JP | 2014181804 | 9/2014 | | F16H 47/02 |

OTHER PUBLICATIONS

International Preliminary Report on Patentability issued in application No. PCT/JP2017/029875, dated Mar. 14, 2019 (8 pgs).
Chinese Office Action (w/translation) issued in application No. 201780050989.9, dated Jan. 1, 2020 (13 pgs).
European Office Action issued in application No. 17846202.4, dated Mar. 25, 2020 (6 pgs).

* cited by examiner

FLUID PRESSURE CIRCUIT

TECHNICAL FIELD

The present invention relates to a fluid pressure circuit having a fluid pump and a fluid motor, as typified by a hydraulic static transmission circuit (referred to as an HST circuit).

BACKGROUND ART

Figure 8:
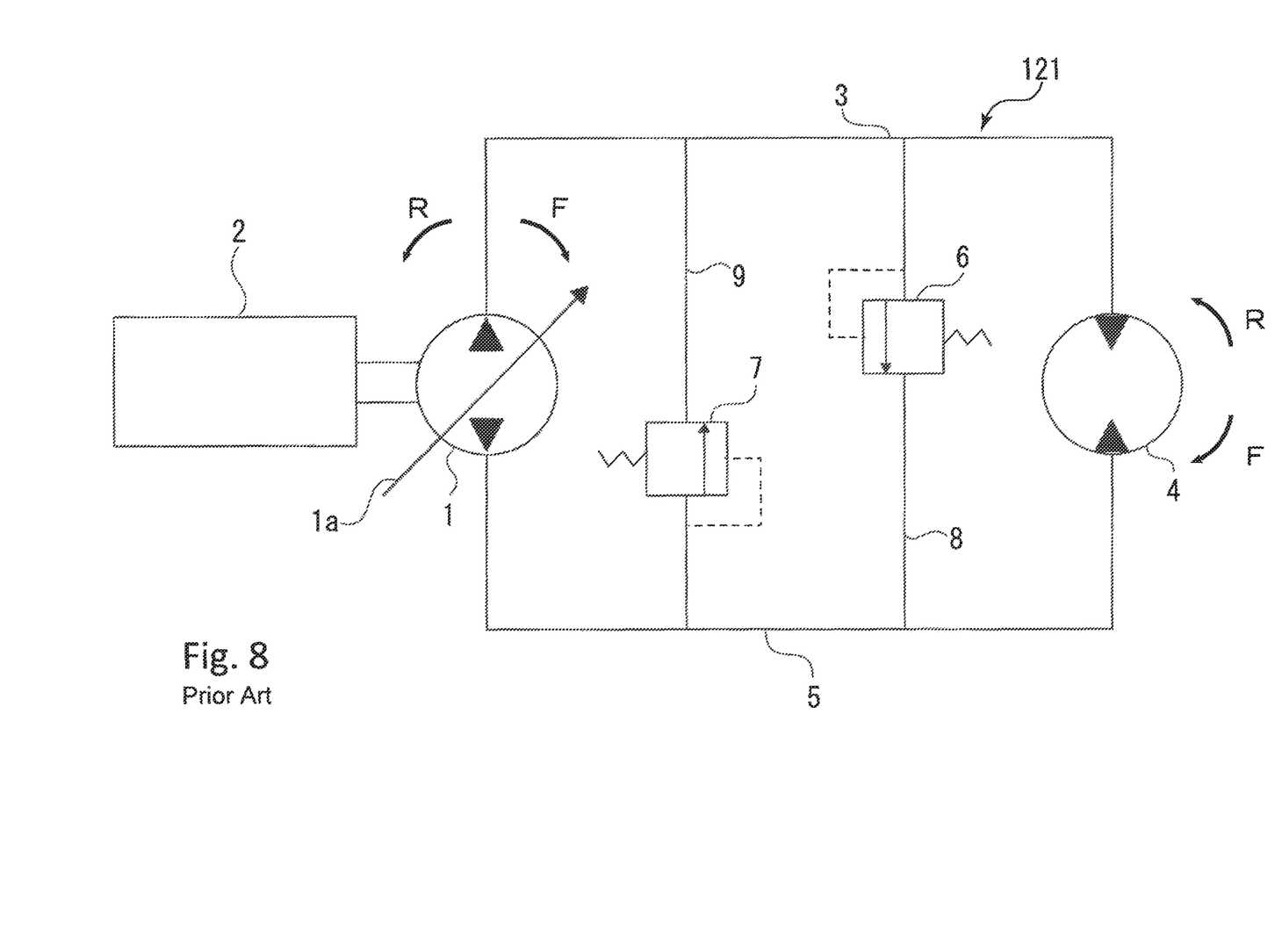
FIG. 8 is a diagram of a conventional hydraulic circuit.

A conventional HST circuit for traveling a wheel loader will be described, the HST circuit being configured as a closed circuit having a hydraulic pump and a hydraulic motor (see, e.g., Patent Citation 1). Referring to FIG. 8, a hydraulic pump 1 is a variable capacity bidirectionally-rotatable pump to be driven by a drive mechanism 2 such as an engine. In the case of performing forward rotation F of the hydraulic pump 1, oil discharged from the hydraulic pump 1 flows into a bidirectionally-rotatable hydraulic motor 4 through a line 3, and then, flows out to a line 5. The oil having passed through the line 5 flows into the hydraulic pump 1. Forward rotation F of the hydraulic motor 4 occurs due to a pressure difference between before and after the hydraulic motor 4.

In the case of performing reverse rotation R of the hydraulic pump 1, the oil discharged from the hydraulic pump 1 flows into the hydraulic motor 4 through the line 5, and then, flows out to the line 3. The oil having passed through the line 3 flows into the hydraulic pump 1. Reverse rotation R of the hydraulic motor 4 occurs due to the pressure difference between before and after the hydraulic motor 4.

Relief valves 6, 7 are further installed in the circuit. These relief valves 6, 7 are set to a predetermined relief pressure. When a high pressure generated at the line 3 reaches the relief pressure, the relief valve 6 is operated such that the oil flows out to a low-pressure line 8, thereby preventing overload of the line 3. Similarly, a high pressure generated at the line 5 reaches the relief pressure, the relief valve 7 is operated such that the oil flows out to a low-pressure line 9, and in this manner, overload of the line 5 is prevented.

The hydraulic pump 1 is configured so that the amount of oil discharged from the hydraulic pump 1 can be controlled from 0 (zero) to the maximum value by changing the tilting amount of a swash plate 1$a$ from 0 (zero) to the maximum value in accordance with an external signal (not shown).

Figure 9:
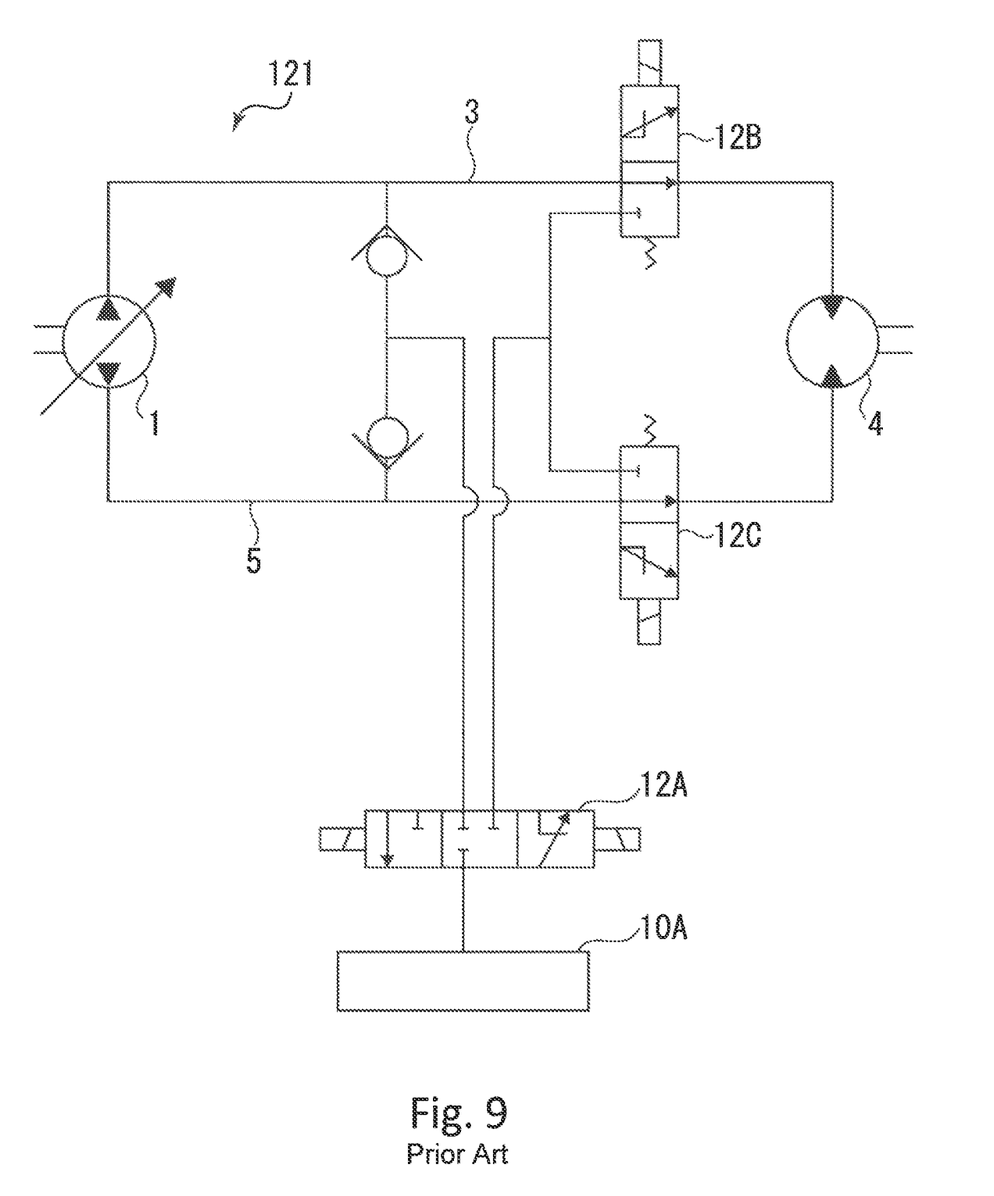
FIG. 9 is a diagram of another conventional hydraulic circuit.

Referring to FIG. 9, there has been proposed another HST circuit used for travelling a vehicle (also referred to as a travelling HST circuit), which is configured for effectively utilizing high-pressure oil such that an accumulator 10A is connected to a hydraulic motor, that high-pressure oil generated from the hydraulic motor upon deceleration of a vehicle is accumulated in the accumulator 10A, and that the high-pressure oil accumulated in the accumulator 10A is used upon start of the vehicle (see Patent Citation 2).

CITATION LIST

Patent Literature

Patent Citation 1: JP 2014-181804 A (paragraph 0026, FIGS. 1 to 3)
Patent Citation 2: JP 11-006557 A (paragraphs 0044 to 0064, FIGS. 5 to 7)

SUMMARY OF INVENTION

Technical Problem

A vehicle described in Patent Citation 1 uses the traveling HST circuit configured to drive the hydraulic motor 4 by the hydraulic pump 1 to travel the vehicle. The hydraulic pump 1 is driven on a steady basis upon traveling of the vehicle, and for this reason, high durability has been required for the hydraulic pump 1 due to a high frequency of use of the hydraulic pump 1. In particular, when dirt enters a bucket of the wheel loader, a significantly-high load is repeatedly applied to the hydraulic pump 1, and for this reason, high durability has been required for the hydraulic pump 1.

The traveling HST circuit illustrated in FIG. 9 and described in Patent Citation 2 includes the accumulator 10A, and switches electromagnetic valves 12A to 12C to accumulate the oil in the accumulator 10A upon deceleration of the vehicle. Since this circuit is for accumulating the oil in the accumulator 10A upon deceleration of the vehicle, the period of using the oil accumulated in the accumulator 10A is limited. Further, the pressure and amount of oil which can be accumulated in the accumulator 10A depend on a traveling state of the vehicle. For this reason, the hydraulic motor 4 cannot be always driven by the oil accumulated in the accumulator 10A when a high load is applied to the hydraulic pump 1, and high durability has been required for the hydraulic pump 1.

The present invention has been made in view of such a problem, and is intended to provide a fluid pressure circuit capable of reducing a load on a fluid pressure pump.

Solution to Problem

For solving the above-described problem, the fluid pressure circuit according to a first aspect of the present invention is characterized by including an HST circuit having a variable capacity fluid pressure pump to be driven by a mechanism to perform forward-reverse rotation, a fluid pressure motor to be driven by fluid discharged from the fluid pressure pump to perform forward-reverse rotation, a first line configured to connect a first port of the fluid pressure pump and a first port of the fluid pressure motor, and a second line configured to connect a second port of the fluid pressure pump and a second port of the fluid pressure motor, an accumulator connected in parallel with the fluid pressure pump, an accumulator pump configured to accumulate pressure fluid in the accumulator, and an accumulator switching valve configured to switch connection between the fluid pressure motor and the accumulator.

According to the first aspect, the pressure fluid can be accumulated in the accumulator by the accumulator pump provided separately from the HST circuit, and therefore, the pressure fluid accumulated in the accumulator can be supplied to the fluid pressure motor at desired timing. Thus, a load on the fluid pressure pump can be reduced.

The fluid pressure circuit according to a second aspect of the present invention is characterized in that the accumulator switching valve has a first position at which the accumulator is connected to the first port of the fluid pressure motor and the second port of the fluid pressure motor is connected to a reservoir tank, a second position at which the accumulator is connected to the second port of the fluid pressure motor and the first port of the fluid pressure motor is connected to the reservoir tank, and a third position at which the accumulator and the reservoir tank are in non-connection with the first line and the second line.

According to the second aspect, the structure is employed, in which the reservoir tank is connected to one line when the accumulator is connected to the other line. Thus, oil in the line, whose pressure has been increased until then, is discharged to the reservoir tank by switching of the switching valve between the first position and the second position, and therefore, no back pressure is caused in such a line. This means that the rotation of the fluid pressure motor can be quickly reversed.

The fluid pressure circuit according to a third aspect of the present invention is characterized in that the fluid pressure pump is a fluid pressure pump having a swash plate and the tilting amount of the swash plate is smaller in a case where the accumulator switching valve is switched to any of the first position and the second position than in a case where the accumulator switching valve is switched to the third position.

According to the third aspect, the load for driving the fluid pressure pump can be reduced when the fluid pressure motor is driven by the accumulator, and therefore, an energy efficiency is enhanced.

The fluid pressure circuit according to a fourth aspect of the present invention is characterized in that the tilting amount of the swash plate is zero in a case where the accumulator switching valve is switched to any of the first position and the second position.

According to the fourth aspect, the energy efficiency is further enhanced.

The fluid pressure circuit according to a fifth aspect of the present invention is characterized by further including a fluid pressure pump switching valve having a communication position at which the first line allows the fluid pressure pump and the fluid pressure motor to communicate with each other as well as the second line allows the fluid pressure pump and the fluid pressure motor to communicate with each other, and a closing position at which the first line and the second line are closed on a fluid pressure motor side.

According to the fifth aspect, the fluid pressure pump switching valve is switched to the closing position so that the fluid pressure motor can be driven by the accumulator without receiving influence of the fluid pressure pump.

The fluid pressure circuit according to a sixth aspect of the present invention is characterized in that the closing position of the fluid pressure pump switching valve is a position where the first line and the second line communicate with each other on a fluid pressure pump side.

According to the sixth aspect, the fluid pressure pump switching valve is switched to the closing position, and therefore, the first and second ports of the fluid pressure pump are directly connected in a closed loop without other loads than the lines. Thus, the discharge amount of the fluid pressure motor can be set to a desired amount in the state at the closing position. This reduces impact due to fluid pressure fluctuation when driving of the fluid pressure motor is switched from driving by the accumulator to driving by the fluid pressure pump.

Moreover, the HST circuit may be incorporated into a power train of a wheel loader.

According to such an application, the fluid pressure motor can be driven by the pressure fluid accumulated in the accumulator when dirt enters a bucket of the wheel loader, and therefore, the load on the fluid pressure pump can be reduced.

Further, when driving of the fluid pressure motor is switched from driving by the accumulator to driving by the fluid pressure pump in a state in which the fluid pressure pump switching valve is at the closing position, the tilting amount of the swash plate of the fluid pressure pump such that the output energy of the fluid pressure pump reaches a level equal to the output energy of the accumulator.

This results in the fact that the impact due to fluid pressure fluctuation when driving of the fluid pressure motor is switched from driving by the accumulator to driving by the fluid pressure pump can be reduced.

DESCRIPTION OF EMBODIMENTS

The mode for implementing the fluid pressure circuit according to the present invention will be described below with reference to the following embodiments. Note that in the present embodiments, "-N" is assigned to a reference numeral for a neutral position (in other words, a normal position) of a valve, and "-A" or "-B" is assigned to a reference numeral for a position other than the neutral position.

First Embodiment

Figure 1:
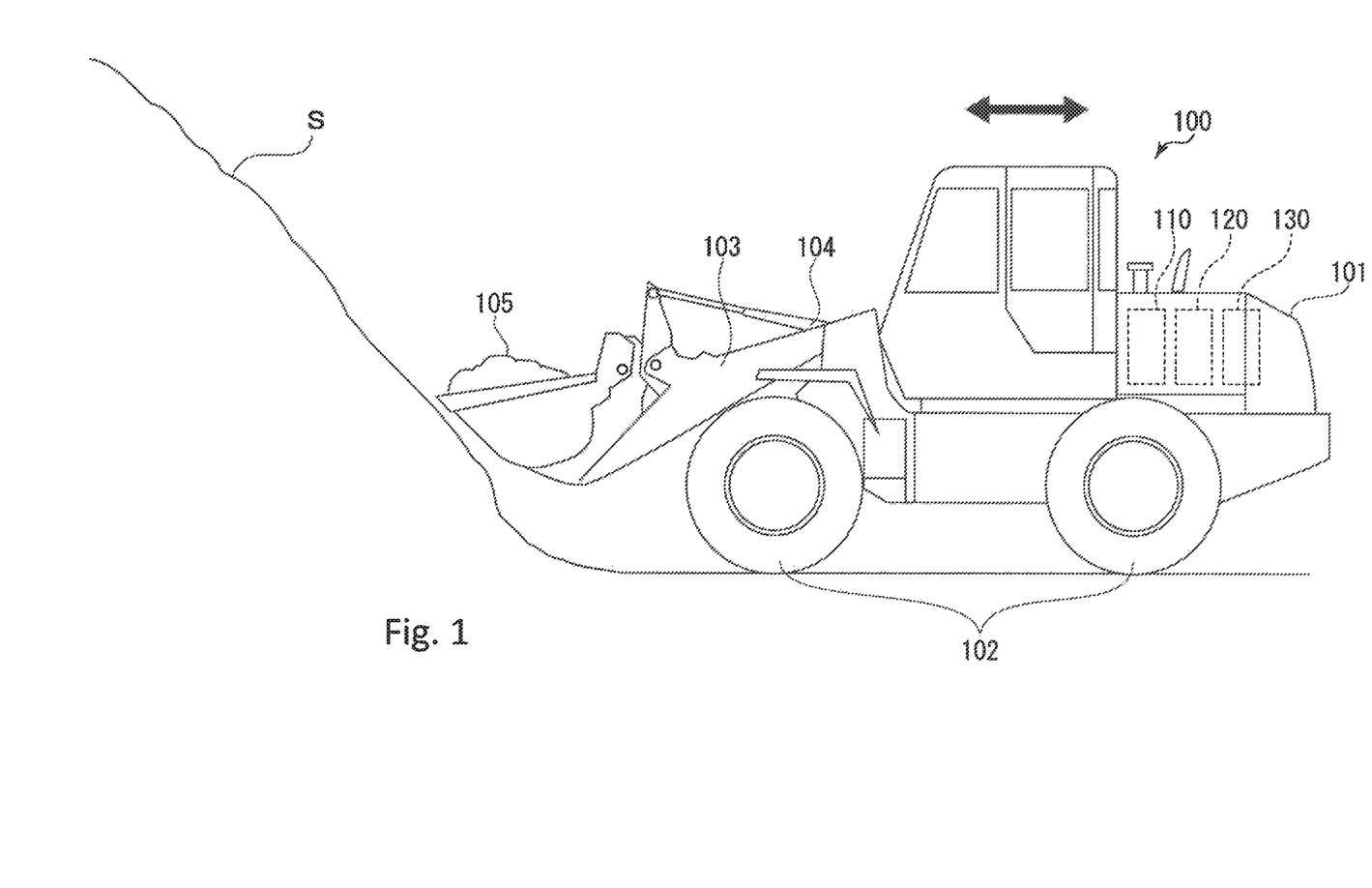
FIG. 1 is a view of a wheel loader incorporating a first embodiment of a fluid pressure circuit according to the present invention.

A hydraulic circuit 120 (corresponding to the first embodiment of the fluid pressure circuit) is incorporated into a power train of a wheel loader 100 illustrated in FIG. 1. The wheel loader 100 mainly includes a vehicle body 101, travelling wheels 102, a working arm 103, a hydraulic actuator 104, and a bucket 105 for ballast S etc. The vehicle body 101 includes a mechanism 110 such as an engine, the travelling hydraulic circuit 120, and a working hydraulic circuit 130 configured to drive the hydraulic actuator 104 etc.

Figure 2:
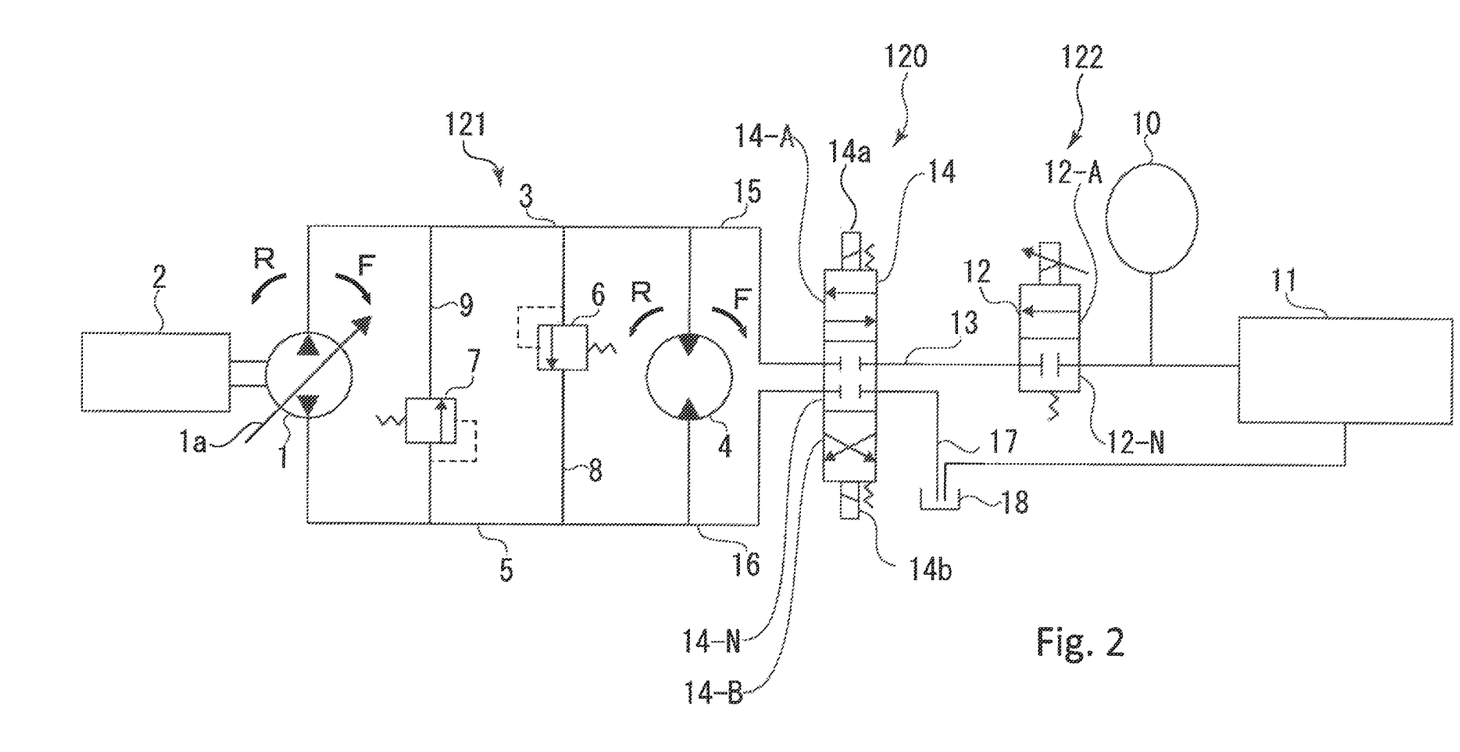
FIG. 2 is a circuit diagram showing the first embodiment of the fluid pressure circuit.
Figure 3:
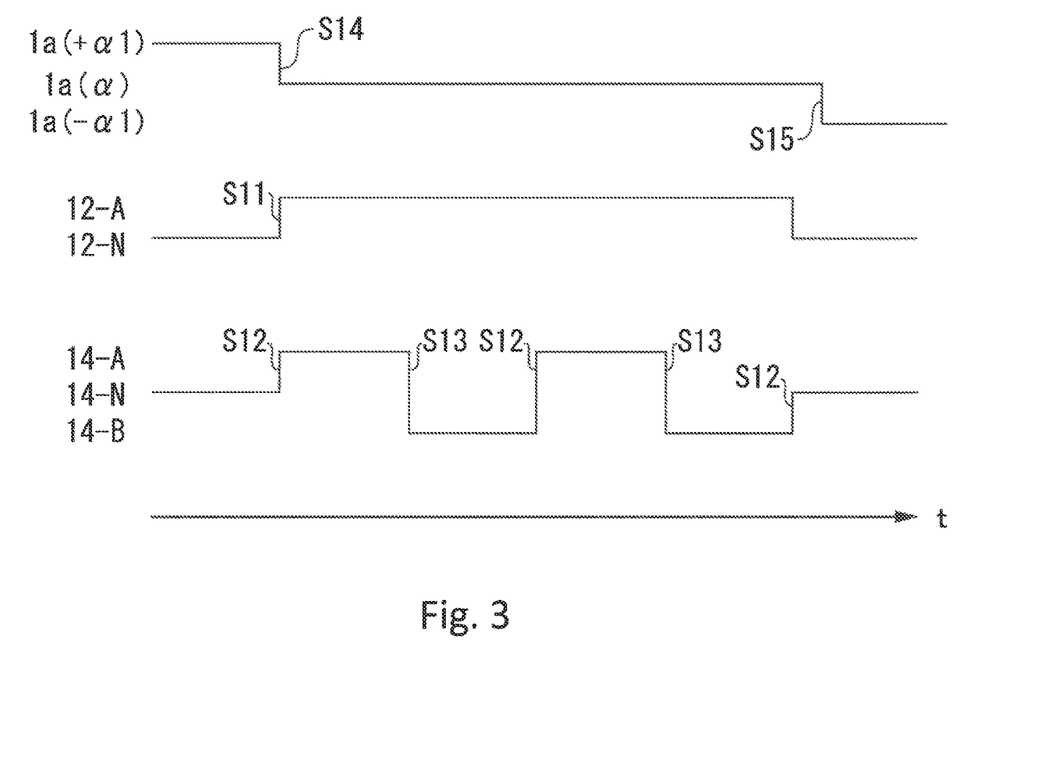
FIG. 3 is a timing chart of operation of a swash plate 1$a$, an electromagnetic proportional valve 12, and an electromagnetic switching valve 14 for describing operation of the first embodiment, a value in parenthesis of the figure indicating the tilting amount $\alpha$ of the swash plate 1$a$ (note that $\alpha$1 is an absolute value)

Referring to FIGS. 2 and 3, the hydraulic circuit 120 mainly includes a traveling HST circuit 121 configured as a closed circuit that is provided with a hydraulic pump 1 having first and second ports for inlet and outlet, a hydraulic motor 4 having first and second ports for inlet and outlet and an accumulator supply circuit 122. The traveling HST circuit 121 is as described above, and therefore, description thereof is not repeated. Note that a drive mechanism 2 includes the mechanism 110 such as the engine, and a not-shown power transmission mechanism.

The accumulator supply circuit 122 mainly includes an accumulator 10, an accumulator pump 11, an electromagnetic proportional valve 12, and a four-port three-position electromagnetic switching valve 14 (corresponding to an accumulator switching valve of the present invention and hereinafter also referred to as an electromagnetic switching valve 14). The accumulator pump 11 is a pump provided independently of the hydraulic pump 1, such as a gear pump or a plunger pump, and is driven by the mechanism 110 or a not-shown storage battery to accumulate, in the accumulator 10, pressure oil from a reservoir tank 18. The four-port three-position electromagnetic switching valve 14 is provided between the electromagnetic proportional valve 12 and the HST circuit 121 as the closed circuit; and lines 15, 16 are, at one ends thereof, connected to two ports of the four-port three-position electromagnetic switching valve 14, and are, at the other ends thereof, connected to lines 3, 5 (corresponding to a first line and a second line of the present invention, respectively). Moreover, lines 13, 17 are connected to the remaining two ports of the four-port three-position electromagnetic switching valve 14. The line 13 is connected to the accumulator 10 and the accumulator pump 11 with the electromagnetic proportional valve 12 being connected to the middle of the line 13. Further, the line 17 is connected to the reservoir tank 18.

The electromagnetic switching valve 14 closes, at a neutral position 14-N thereof, the lines 13, 15, 16, 17. When a solenoid 14a is excited, the electromagnetic switching valve 14 is switched to an A-position 14-A, thereby allowing communication between the line 13 and the line 15 and communication between the line 16 and the line 17. When a solenoid 14b is excited, the electromagnetic switching valve 14 is switched to a B-position 14-B, thereby allowing communication between the line 13 and the line 16 and communication between the line 15 and the line 17. Further, the electromagnetic proportional valve 12 allows communication between the accumulator 10 and the line 13 at an operation position 12-A of the electromagnetic proportional valve 12, and closes the accumulator 10 and the line 13 at a non-operation position 12-N of the electromagnetic proportional valve 12.

Next, operation of the hydraulic circuit 120 will be described. Note that a manner to drive the hydraulic motor 4 by operation of the hydraulic pump 1 is similar to that described above, and therefore, description thereof will not be repeated. Operation of the accumulator supply circuit 122 will be mainly described.

First, oil with a desired pressure is accumulated in the accumulator 10 by the accumulator pump 11 for desired periods. By operation (S11) of the electromagnetic proportional valve 12 and excitation (S12) of the solenoid 14a of the electromagnetic switching valve 14, the accumulator 10 communicates with the line 3 through the line 13, and the line 16 communicates with the reservoir tank 18 through the line 17. At the same time, the tilting amount α of a swash plate 1a of the hydraulic pump 1 is changed from +α1 to 0 (zero) (S14).

By these types of operation (S11, S12, S14), the pressure oil accumulated in the accumulator 10 flows into the hydraulic motor 4 through the line 15, and the oil having flowed out of the hydraulic motor 4 is discharged to the reservoir tank 18 through the line 16. This allows forward rotation F of the hydraulic motor 4.

Similarly, although not shown, the tilting amount α of the swash plate 1a of the hydraulic pump 1 is changed to 0 (zero) (S14) at the same time as operation (S11) of the electromagnetic proportional valve 12 and excitation (S13) of the solenoid 14b of the electromagnetic switching valve 14.

By these types of operation (S11, S13, S14), the pressure oil accumulated in the accumulator 10 flows into the hydraulic motor 4 through the line 16, and the oil having flowed out of the hydraulic motor 4 is discharged to the reservoir tank 18 through the lines 15, 17. This allows reverse rotation R of the hydraulic motor 4.

As described above, the hydraulic motor 4 can be driven by the pressure oil accumulated in the accumulator 10, and therefore, a load on the drive mechanism 2 can be reduced. Thus, energy saving of the HST circuit 121 as the closed circuit can be realized.

Moreover, when the pressure oil is supplied from the accumulator 10 to the hydraulic motor 4, the tilting amount α of the swash plate 1a of the hydraulic pump 1 is 0 (zero). Therefore, the load on the drive mechanism 2 can be reduced. Note that an example where the tilting amount α is changed to 0 (zero) has been described, but the load on the drive mechanism 2 can be reduced as long as the tilting amount α becomes smaller than that upon such normal driving that the electromagnetic switching valve 14 is at the neutral position 14-N.

It has been known that output energy L from the hydraulic pump 1 is proportional to the product of a discharge amount Q and a pressure P from the hydraulic pump 1 (see Expression (1) below).

$$L = K \cdot P \cdot Q \text{(note that } K \text{ is a constant)} \qquad \text{Expression 1}$$

A significantly-high load is repeatedly applied to the hydraulic circuit when dirt enters the bucket 105 of the wheel loader 100, and significantly-high durability is demanded for the HST circuit 121. In the first embodiment, the hydraulic motor 4 is, upon entrance of the dirt, driven by the pressure oil accumulated in the accumulator 10, and the hydraulic pump 1 is substantially under no load. Thus, a load on the hydraulic pump 1 is significantly reduced so that durability can be improved.

Moreover, there is a working state in which the wheel loader 100 is moved back and forth in a short amount of time upon entrance of the dirt. FIG. 3 illustrates an example where the electromagnetic switching valve 14 is switched four times, as well as illustrating an example where the hydraulic motor 4 is continuously driven by the accumulator 10 and the hydraulic pump 1. In the case of such a working state, a structure is employed, in which the reservoir tank 18 is connected to one of the line 5 and the line 3 when the accumulator 10 is connected to the other one of the line 3 and the line 5. Thus, oil in the line 3 or the line 5, whose pressure has been increased until then, is discharged to the reservoir tank 18 by switching of the electromagnetic switching valve 14 between the A-position 14-A and the B-position 14-B, and therefore, no back pressure is caused in the line 3 or the line 5. This means that the rotation of the hydraulic motor 4 can be quickly reversed. Note that FIG. 3 illustrates the following example: the electromagnetic proportional valve 12 and the electromagnetic switching valve 14 are each brought into the non-operation position 12-3 and a neutral position 14-3 after driving of the hydraulic motor 4 by the accumulator 10 has been terminated; and thereafter, a not-shown controller tilts the swash plate 1*a* in a reverse direction to change the tilting amount α from 0 (zero) to −α1 (S15), and reverse rotation R of the hydraulic motor 4 is performed by the hydraulic pump 1.

The accumulator pump 11 is provided independently of the hydraulic pump 1, and the accumulator 10 and the accumulator pump 11 can be disconnected from the HST circuit 121 by the electromagnetic switching valve 14. Thus, the pressure oil can be accumulated in the accumulator 10 by the accumulator pump 11 for the desired periods. As described above, the pressure oil can be accumulated in the accumulator 10 by the accumulator pump 11 regardless of a traveling state of a vehicle, and therefore, there is less restriction on the timing of allowing use of the pressure oil accumulated in the accumulator 10.

Further, as the accumulator pump 11 configured to accumulate the pressure oil in the accumulator 10, a constant-capacity pump can be adopted, and therefore, the structure thereof can be simplified. Moreover, the timing of operating the accumulator pump 11 can be freely selected, and therefore, a pump with a small maximum output, such as a pump with a smaller maximum output than that of the hydraulic pump 1, can be adopted as the accumulator pump.

Second Embodiment

Figure 4:
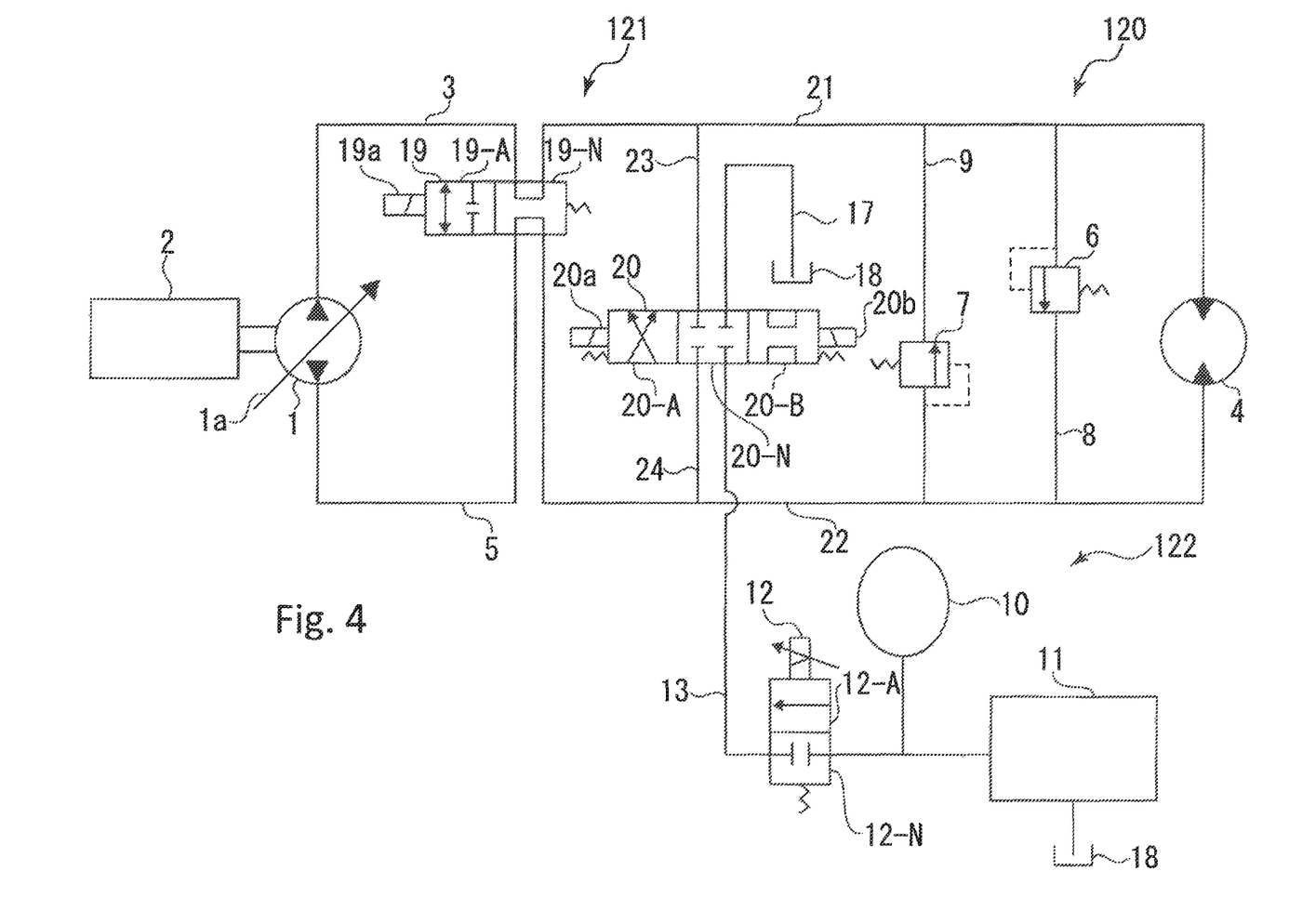
FIG. 4 is a circuit diagram showing a second embodiment of the fluid pressure circuit.

Next, the second embodiment of the fluid pressure circuit will be described with reference to FIGS. 4 and 5. The second embodiment is mainly different from the first embodiment in that a four-port two-position electromagnetic switching valve 19 (corresponding to a fluid pressure pump switching valve of the present invention) and a four-port three-position electromagnetic switching valve 20 (corresponding to an accumulator switching valve of the present invention and hereinafter also referred to as an electromagnetic switching valve 20) are provided. Configurations similar to those of the first embodiment will not be described.

The electromagnetic switching valve 19 allows, at a communication position 19-N, communication between the line 3 and a line 21 (collectively corresponding to the first line) and communication between the line 5 and a line 22 (collectively corresponding to the second line). By excitation of a solenoid 19*a*, the electromagnetic switching valve 19 is switched to a closing position 19-A, thereby allowing communication between the line 3 and the line 5 and closing the line 21 and the line 22. Note that the line 3, the line 21, the line 5, and the line 22 form a closed circuit of an HST circuit 121.

Moreover, the electromagnetic switching valve 20 closes, at a neutral position 20-N, a line 23 branching from the line 21, a line 24 branching from the line 22, a line 13, and a line 17. By excitation of a solenoid 20*a*, the electromagnetic switching valve 20 is switched to an A-position 20-A, thereby allowing communication between the line 13 and the line 21 through the line 23 and communication between the line 22 and a reservoir tank 18 through the line 17 and the line 24.

Further, by excitation of a solenoid 20*b*, the electromagnetic switching valve 20 is switched to a B-position 20-B, thereby allowing communication between the line 13 and the line 22 through the line 24 and communication between the line 21 and the reservoir tank 18 through the line 17 and the line 23.

As described above, when pressure oil is supplied from an accumulator 10 to a hydraulic motor 4, operation (S21) of an electromagnetic proportional valve 12 and operation (S22) of the electromagnetic switching valve 19 allow communication between the line 3 and the line 5, and in this manner, a no-load closed circuit excluding the line 3 and the line 5 is formed, and the line 21 and the line 22 are closed.

At the same time, by excitation (S23) of the solenoid 20*a* of the electromagnetic switching valve 20, the electromagnetic switching valve 20 is switched to the A-position 20-A, thereby allowing communication between the line 13 and the line 21 through the line 23 and communication between the line 22 and the reservoir tank 18 through the line 17 and the line 24. In this manner, the pressure oil accumulated in the accumulator 10 flows into the hydraulic motor 4, and the oil having flowed out of the hydraulic motor 4 is discharged to the reservoir tank 18. This allows forward rotation F of the hydraulic motor 4. In this state, the tilting amount α of a swash plate 1*a* of a hydraulic pump 1 is changed from +α1 to 0 (zero) (S25). Note that it is not necessary to change the tilting amount α of the swash plate 1*a* of the hydraulic pump 1 to 0 (zero) at this timing, and the tilting amount α may be maintained.

Similarly, by excitation (S24) of the solenoid 20*b* of the electromagnetic switching valve 20, the electromagnetic switching valve 20 is switched to the B-position 20-B, thereby allowing communication between the line 13 and the line 22 through the line 24 and communication between the line 21 and the reservoir tank 18 through the line 17 and the line 23. In this manner, the pressure oil accumulated in the accumulator 10 flows into the hydraulic motor 4, and the oil having flowed out of the hydraulic motor 4 is discharged to the reservoir tank 18. This allows reverse rotation R of the hydraulic motor 4.

Figure 5:
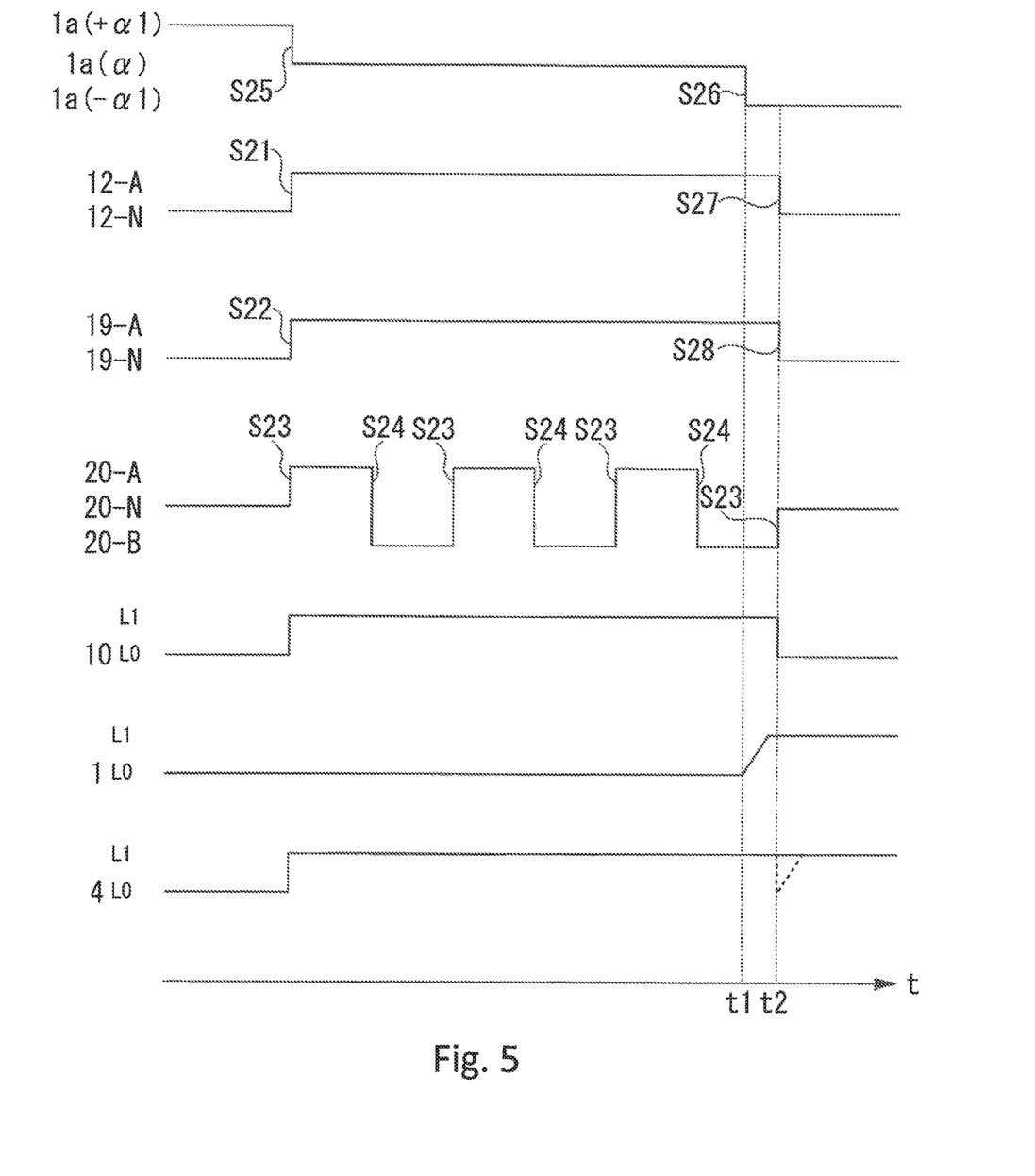
FIG. 5 is a timing chart of operation of a swash plate 1$a$, an electromagnetic proportional valve 12, and electromagnetic switching valves 19, 20 and the pressure oil energy of an accumulator 10, a hydraulic pump 1, and a hydraulic motor 4 for describing operation of the second embodiment.

Note that FIG. 5 illustrates an example where the electromagnetic switching valve 20 is switched six times, as well as illustrating an example where the hydraulic motor 4 is continuously driven by the accumulator 10 and the hydraulic pump 1.

As described above, the electromagnetic switching valve 20 is switched to the B-position 20-B such that both ends of the hydraulic pump 1 are directly connected in a closed loop without other loads than the lines 3, 5. Thus, as illustrated in FIG. 5, even when the tilting amount α of the swash plate 1*a* of the hydraulic pump 1 is not changed to 0 (zero), the hydraulic pump 1 is under no load, and therefore, the power thereof can be significantly reduced. That is, the power can be significantly reduced without a change in the tilting amount α of the swash plate 1*a* of the hydraulic pump 1.

Generally, in a case where the tilting amount α of the swash plate 1*a* of the hydraulic pump 1 is again returned to a value close to the maximum value after the tilting amount α has been changed to 0 (zero), a certain response time is required. For this reason, in a case where the tilting amount α of the swash plate 1*a* of the hydraulic pump 1 is again increased in a short amount of time after the hydraulic motor 4 has been driven by the pressure oil accumulated in the accumulator 10, an instantaneous pump discharge flow rate from the hydraulic pump 1 might be insufficient, leading to occurrence of deceleration shock due to insufficient rotation of the hydraulic motor 4.

When the hydraulic motor 4 is driven by the pressure oil accumulated in the accumulator 10, the tilting amount α of the swash plate 1*a* of the hydraulic pump 1 can be changed to a desired tilting amount α without changing the tilting amount α. Thus, there is no probability that deceleration shock occurs due to insufficient rotation of the hydraulic motor 4.

Specifically, at a time point t1 at which a not-shown controller detects that the pressure accumulation amount of the accumulator 10 decreases to less than a predetermined value within a predetermined time, the tilting amount α of the swash plate 1a of the hydraulic pump 1 is adjusted from 0 (zero) to −α1 such that the output energy of the hydraulic pump 1 is changed from a current output energy L0 (substantially 0 (zero) energy) to a current accumulator output energy L1 (S26). Thereafter, at a time point t2 before a lapse of the above-described predetermined time, the electromagnetic proportional valve 12, the electromagnetic switching valve 19, and the electromagnetic switching valve 20 are each switched to a non-operation position 12-N, the communication position 19-N, and the neutral position 20-N (S23, S27, S28). The output energy of the hydraulic pump 1 gradually increases starting from the time point t1, and reaches equal to L1 at a predetermined time point up to the time point t2. Thus, even when driving is switched to driving by the hydraulic pump 1 at the time point t2, the oil is supplied to the hydraulic motor 4 without energy fluctuation, and therefore, there is no probability that deceleration shock occurs due to insufficient rotation of the hydraulic motor 4. That is, when driving of the hydraulic pump 1 begins at the timing of the time point t2, the energy of the oil supplied to the hydraulic motor 4 at the time point t2 becomes smaller than the output energy L1 as indicated by a dashed line of FIG. 5, leading to insufficient rotation of the hydraulic motor 4.

Third Embodiment

Figure 6:
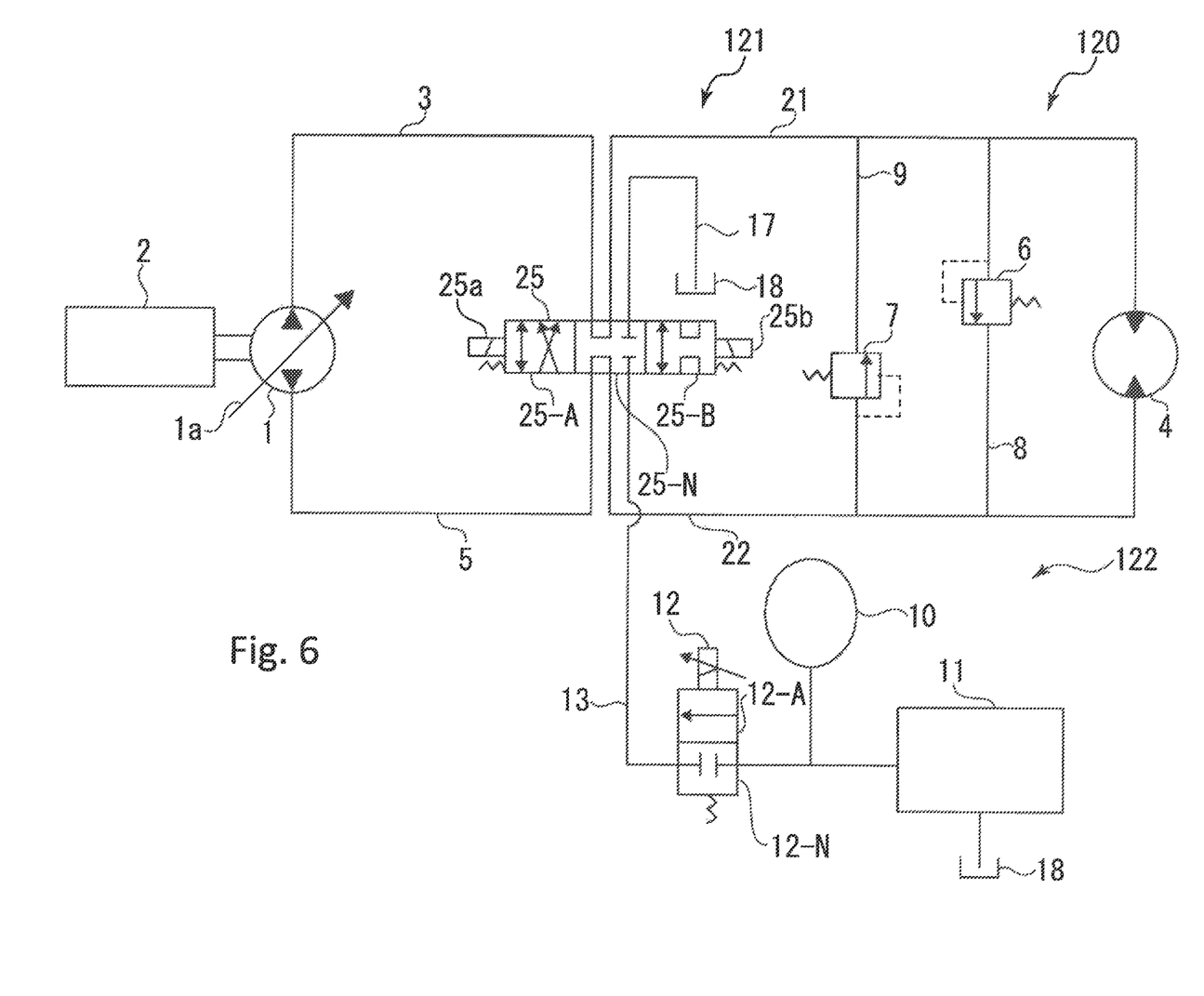
FIG. 6 is a circuit diagram showing a third embodiment of the fluid pressure circuit.

Next, the third embodiment of the fluid pressure circuit will be described with reference to FIGS. 6 and 7. The third embodiment is mainly different from the second embodiment in that a six-port three-position electromagnetic switching valve 25 (corresponding to the accumulator switching valve and the fluid pressure pump switching valve and hereinafter also referred to as an electromagnetic switching valve 25) is provided between an electromagnetic proportional valve 12 and an HST circuit 121. Configurations similar to those of the first and second embodiments will not be described.

The electromagnetic switching valve 25 allows, at a neutral position 25-N (corresponding to a third position of the accumulator switching valve and a communication position of the fluid pressure pump switching valve) thereof, communication between a line 3 and a line 21 and communication between a line 5 and a line 22. Moreover, the electromagnetic switching valve 25 closes a line 13 and a line 17.

In this state, by excitation of a solenoid 25a, the electromagnetic switching valve 25 is switched to an A-position 25-A, thereby allowing not only communication between the line 3 and the line 5 and communication between the line 13 and the line 21, but also communication between the line 22 and a reservoir tank 18 through the line 17.

Moreover, by excitation of a solenoid 25b, the electromagnetic switching valve 25 is switched to a B-position 25-B, thereby allowing not only communication between the line 3 and the line 5 and communication between the line 13 and the line 22, but also communication between the line 21 and the reservoir tank 18 through the line 17.

When pressure oil is supplied from an accumulator 10 to a hydraulic motor 4, operation (S31) of the electromagnetic proportional valve 12 and excitation (S32) of the solenoid 25a of the electromagnetic switching valve 25 switches the electromagnetic switching valve 25 to the A-position 25-A, thereby allowing communication between the line 13 and the line 21 and communication between the line 22 and the reservoir tank 18 through the line 17. In this manner, the pressure oil accumulated in the accumulator 10 flows into the hydraulic motor 4, and the oil having flowed out of the hydraulic motor 4 is discharged to the reservoir tank 18. This allows forward rotation F of the hydraulic motor 4. In this state, the tilting amount α of a swash plate 1a of a hydraulic pump 1 is changed from +α1 to 0 (zero) (S35). Note that it is not necessary to change the tilting amount α of the swash plate 1a of the hydraulic pump 1 to 0 (zero) at this timing, and the tilting amount α may be maintained.

Similarly, by excitation (S33) of the solenoid 25b of the electromagnetic switching valve 25, the electromagnetic switching valve 25 is switched to the B-position 25-B, thereby allowing communication between the line 13 and the line 22 and communication between the line 21 and the reservoir tank 18 through the line 17. As a result, the pressure oil accumulated in the accumulator 10 flows into the hydraulic motor 4, and the oil having flowed out of the hydraulic motor 4 is discharged to the reservoir tank 18. This allows reverse rotation R of the hydraulic motor 4.

Figure 7:
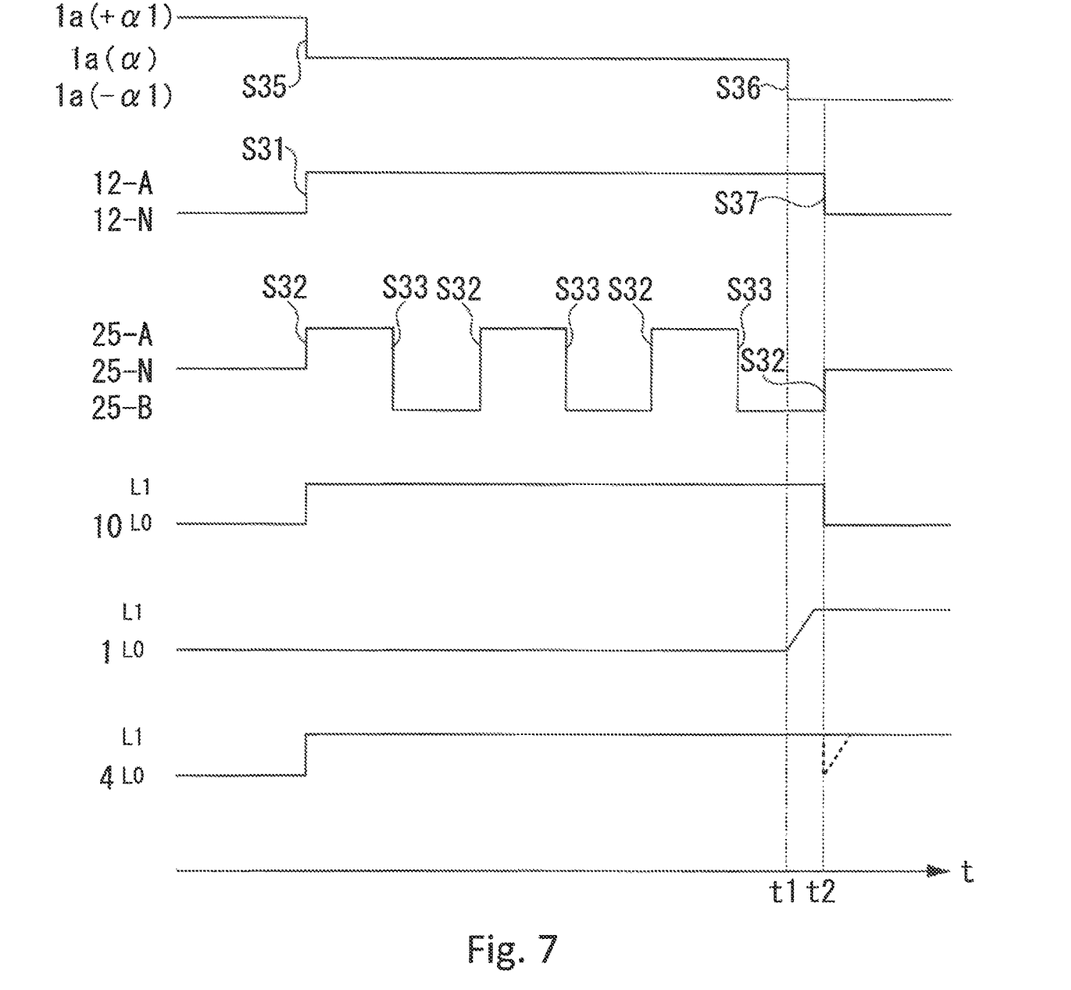
FIG. 7 is a timing chart of operation of a swash plate 1$a$, an electromagnetic proportional valve 12, and an electromagnetic switching valve 25 and the pressure oil energy of an accumulator 10, a hydraulic pump 1, and a hydraulic motor 4 for describing operation of the third embodiment.

Note that FIG. 7 illustrates an example where the electromagnetic switching valve 25 is switched six times.

The hydraulic motor 4 is driven by the pressure oil accumulated in the accumulator 10, and power for a drive mechanism 2 is minimized. Consequently, energy saving of the HST circuit 121 can be realized.

Moreover, the electromagnetic switching valve 25 is switched to the A-position 25-A or the B-position 25-B (corresponding to the first position or the second position of the accumulator switching valve and both corresponding to a closing position of the fluid pressure pump switching valve) such that both the first and second ports of the hydraulic pump 1 are directly connected in a closed loop without other loads than the lines 3, 5 as in the second embodiment. At a time point t1 at which it is detected that the pressure accumulation amount of the accumulator 10 decreases to less than a predetermined value within a predetermined time, the tilting amount α of the swash plate 1a of the hydraulic pump 1 is adjusted from 0 (zero) to −α1 such that the output energy of the hydraulic pump 1 reaches equal to a current accumulator output energy L1 (S36). At a time point t2, the electromagnetic proportional valve 12 and the electromagnetic switching valve 25 are switched to the first position (S32, S36). Thus, the hydraulic pump 1 is, as in the second embodiment, under no load without changing the tilting amount α of the swash plate 1a of the hydraulic pump 1 to 0 (zero). Consequently, there is no probability that deceleration shock occurs due to insufficient rotation of the hydraulic motor 4. Moreover, a load on the hydraulic pump 1 for traveling a wheel loader 100 configured such that the HST circuit 121 is applied to a traveling system is significantly reduced so that durability can be improved.

The embodiments of the present invention have been described above with reference to the drawings, but specific configurations are not limited to these embodiments. The present invention includes changes and additions made without departing from the gist of the present invention.

For example, the case of using the electromagnetic switching valve 14, 19, 25 has been described, but a manual switching valve may be employed.

Moreover, the oil has been described as an example of the fluid, but the present invention is applicable to all types of fluid other than the oil, such as water and air. Considering responsibility, the fluid is preferably substantially-incompressible fluid such as water or oil.

Further, the hydraulic circuit 120 incorporated into the power train has been described as an example, but other hydraulic circuits than the hydraulic circuit for the power train may be used.

In addition, the drive mechanism 2 may have a mechanically-disengageable clutch. In this case, the clutch may be, in the first embodiment, disengaged instead of changing the tilting amount α of the swash plate 1*a* of the hydraulic pump 1 to 0 (zero) when the hydraulic motor 4 is driven by the pressure oil of the accumulator 10.

Moreover, in the second embodiment, when the pressure oil accumulated in the accumulator 10 is supplied to the hydraulic motor 4, the tilting amount α of the swash plate 1*a* of the hydraulic pump 1 may be changed to 0 (zero) without operation of the electromagnetic switching valve 19 at S22. In this case, features and advantageous effects similar to those of the first embodiment can be provided.

Further, the example where the electromagnetic switching valve 14 is switched four times has been described in the first embodiment, and the example where the electromagnetic switching valves 20, 25 are each switched six times has been described in the second and third embodiments. Needless to say, the number of times of switching varies according to a working condition.

In addition, the four-port three-position valve has been described as examples of the electromagnetic switching valves 14, 20 in the first and second embodiments, and the six-port three-position electromagnetic switching valve has been described as an example of the electromagnetic switching valve 25 in the third embodiment. However, as long as functions similar to those of the electromagnetic switching valves 14, 20, 25 are satisfied, a plurality of electromagnetic switching valves may constitute one of the aforesaid valves. For example, the four-port three-position electromagnetic switching valve 14 may include two four-port two-position electromagnetic switching valves.

Moreover, the hydraulic circuit of the wheel loader has been described as an example, but the present invention can be utilized for hydraulic circuits of machines such as an automobile, a construction machine, a transporter vehicle, an industrial vehicle, and an industrial machine.

REFERENCE SIGNS LIST 1 hydraulic pump (fluid pressure pump)
1*a* swash plate
2 drive mechanism
3, 21 line (first line)
4 hydraulic motor (fluid pressure motor)
5, 22 line (second line)
10 accumulator
11 accumulator pump
14 four-port three-position electromagnetic switching valve (accumulator switching valve)
  14-A A-position (first position)
  14-B B-position (second position)
  14-N neutral position (third position)
18 reservoir tank
19 four-port two-position electromagnetic switching valve (fluid pressure pump switching valve)
  19-A closing position
  19-N communication position
20 four-port three-position electromagnetic switching valve (accumulator switching valve)
  20-A A-position (first position)
  20-B B-position (second position)
  20-N neutral position (third position)
25 six-port three-position electromagnetic switching valve (accumulator switching valve, fluid pressure pump switching valve)
  25-A A-position (first position, closing position)
  25-B B-position (second position, closing position)
  25-N neutral position (third position, communication position)
100 wheel loader
110 mechanism
120 hydraulic circuit (fluid pressure circuit)
121 HST circuit
122 accumulator supply circuit

The invention claimed is:

1. A fluid pressure circuit comprising
an HST circuit and an accumulator supply circuit,
the HST circuit including:
  a variable capacity fluid pressure pump configured to be driven by a mechanism to perform forward-reverse rotation;
  fluid pressure motor configured to be driven by fluid discharged from the fluid pressure pump to perform forward-reverse rotation;
  a first line connected to a first port of the fluid pressure pump and a first port of the fluid pressure motor; and
  a second line connected to a second port of the fluid pressure pump and a second port of the fluid pressure motor;
the accumulator supply circuit including:
an accumulator switching valve connected to the first line and the second line of the HST circuit;
an accumulator capable of being connected to either one of the first line and the second line of the HST circuit through the accumulator switching valve;
an accumulator pump configured to accumulate pressure fluid in the accumulator; and
an electromagnetic proportional valve interposed between the accumulator switching valve and the accumulator to switch connection and disconnection between the accumulator and the accumulator switching valve,
wherein when the fluid pressure motor is driven by the pressure fluid accumulated in the accumulator, the electromagnetic proportional valve is switched to allow the pressure fluid from the accumulator to be supplied to the fluid pressure motor through the accumulator switching valve, and
wherein the accumulator switching valve has:
  a first position at which the accumulator is connected to the first port of the fluid pressure motor and the second of the fluid pressure motor is connected to a reservoir tank;
  second position at which the accumulator is connected to the second port of the fluid pressure motor and the first port of the fluid pressure motor is connected to the reservoir tank; and
  a third position at which the accumulator and the reservoir tank are in non-connection with the first line and the second line.

2. The fluid pressure circuit according to claim 1, wherein
the fluid pressure pump is a fluid pressure pump having a swash plate, and
a tilting amount of the swash plate is smaller in a case where the accumulator switching valve is switched to any of the first position and the second position than in a case where the accumulator switching valve is switched to the third position.

3. The fluid pressure circuit according to claim 2, wherein the tilting amount of the swash plate is zero in a case where the accumulator switching valve is switched to any of the first position and the second position.

4. The fluid pressure circuit according to claim 1, wherein:
the first line comprises a first sub-passage connected to the first port of the fluid pressure pump and a second sub-passage connected to the first port of the fluid pressure motor,
the second line comprises a first sub-passage connected to the second port of the fluid pressure pump and a second sub-passage connected to the second port of the fluid pressure motor,
the fluid passage circuit further comprises a fluid pressure pump switching valve disposed between the first sub-passage and the second sub-passage of the first line and between the first sub-passage and the second sub-passage of the second line and,
the fluid pressure pump switching valve has
a communication position at which the first sub-passage and the second sub-passage of the first line are allowed to communicate with each other for connecting the first ports of the fluid pressure pump and the fluid pressure motor to each other and the first sub-passage and the second sub-passage of the second line are allowed to communicate with each other for connecting the second ports of the fluid pressure pump and the fluid pressure motor to-each other, and
a closing position at which the first sub-passage and the second sub-passage of the first line are closed to each other for disconnecting the first ports of the fluid pressure pump and the fluid pressure motor, the first sub-passage and the second sub-passage of the second line are closed to each other for disconnecting the second ports of the fluid pressure pump and the fluid pressure motor.

5. The fluid pressure circuit according to claim 4, wherein the closing position of the fluid pressure pump switching valve is a position where the first sub-passage of the first line and the first sub-passage of the second line communicate with each other.

6. A fluid pressure circuit comprising
an HST circuit and an accumulator supply circuit,
the HST circuit including:
a variable capacity fluid pressure pump configured to be driven by a mechanism to perform forward-reverse rotation;
a fluid pressure motor configured to be driven by fluid discharged from the fluid pressure pump to perform forward-reverse rotation;
a first line connected to a first port of the fluid pressure pump and a first port of the fluid pressure motor; and
a second line connected to a second port of the fluid pressure pump and a second port of the fluid pressure motor;
the accumulator supply circuit including:
an accumulator switching valve connected to the first line and the second line of the HST circuit;
an accumulator capable of being connected to either one of the first line and the second line of the HST circuit through the accumulator switching valve;
an accumulator pump configured to accumulate pressure fluid in the accumulator; and
an electromagnetic proportional valve interposed between the accumulator switching valve and the accumulator to switch connection and disconnection between the accumulator and the accumulator switching valve,
wherein when the fluid pressure motor is driven by the pressure fluid accumulated in the accumulator, the electromagnetic proportional valve is switched to allow the pressure fluid from the accumulator to be supplied to the fluid pressure motor through the accumulator switching valve, and
wherein the first line comprises a first sub-passage connected to the first port of the fluid pressure pump and a second sub-passage connected to the first port of the fluid pressure motor,
the second line comprises a first sub-passage connected to the second port of the fluid pressure pump and a second sub-passage connected to the second port of the fluid pressure motor,
the fluid passage circuit further comprises a fluid pressure pump switching valve disposed between the first sub-passage and the second sub-passage of the first line and between the first sub-passage and the second sub-passage of the second line and,
the fluid pressure pump switching valve has
a communication position at which the first sub-passage and the second sub-passage of the first line are allowed to communicate with each other for connecting the first ports of the fluid pressure pump and the fluid pressure motor to each other and the first sub-passage and the second sub-passage of the second line are allowed to communicate with each other for connecting the second ports of the fluid pressure pump and the fluid pressure motor to-each other, and
a closing position at which the first sub-passage and the second sub-passage of the first line are closed to each other for disconnecting the first ports of the fluid pressure pump and the fluid pressure motor, the first sub-passage and the second sub-passage of the second line are closed to each other for disconnecting the second ports of the fluid pressure pump and the fluid pressure motor.

7. The fluid pressure circuit according to claim 6, wherein the closing position of the fluid pressure pump switching valve is a position where the first sub-passage of the first line and the first sub-passage of the second line communicate with each other.

* * * * *